United States Patent

Sawada et al.

(10) Patent No.: US 7,783,402 B2
(45) Date of Patent: Aug. 24, 2010

(54) VEHICLE STABILITY CONTROL SYSTEM

(75) Inventors: Mamoru Sawada, Yokkaichi (JP); Toshiki Matsumoto, Kariya (JP); Takehito Fujiii, Anjo (JP); Tsutomu Tashiro, Nagoya (JP)

(73) Assignee: Denso Corporation, Kariya (JP)

( * ) Notice: Subject to any disclaimer, the term of this patent is extended or adjusted under 35 U.S.C. 154(b) by 778 days.

(21) Appl. No.: 11/201,489

(22) Filed: Aug. 11, 2005

(65) Prior Publication Data
US 2006/0041353 A1    Feb. 23, 2006

(30) Foreign Application Priority Data
Aug. 20, 2004    (JP)  .............................. 2004-241009

(51) Int. Cl.
*B60G 17/00*    (2006.01)

(52) U.S. Cl. .............................. 701/38; 701/42; 701/69; 701/70; 701/111; 180/65.1; 180/65.21; 180/65.28; 180/65.285; 180/65.31; 280/5.513

(58) Field of Classification Search .................. 701/70, 701/94, 38, 42, 69, 111; 180/65.1, 65.21, 180/65.28, 65.285, 65.31; 280/5.513
See application file for complete search history.

(56) References Cited

U.S. PATENT DOCUMENTS

| | | | |
|---|---|---|---|
| 4,728,120 A * | 3/1988 | Buma et al. .............. | 280/5.519 |
| 5,726,886 A | 3/1998 | Yamakado et al. | |
| 5,960,376 A | 9/1999 | Yamakado et al. | |
| 6,064,931 A * | 5/2000 | Sawada et al. ................ | 701/41 |
| 6,102,144 A | 8/2000 | Lutz | |
| 6,138,629 A | 10/2000 | Masberg et al. | |
| 6,192,305 B1 * | 2/2001 | Schiffmann ................. | 701/45 |
| 6,244,368 B1 * | 6/2001 | Ando et al. ................. | 180/65.2 |
| 6,856,885 B2 * | 2/2005 | Lin et al. ..................... | 701/70 |
| 6,976,388 B2 * | 12/2005 | Heap et al. ................. | 73/115.02 |
| 7,110,867 B2 * | 9/2006 | Imazu .......................... | 701/22 |
| 2001/0020789 A1 * | 9/2001 | Nakashima ................. | 290/40 C |
| 2002/0190683 A1 * | 12/2002 | Karikomi et al. ........... | 318/632 |

(Continued)

FOREIGN PATENT DOCUMENTS

EP    1 097 834    5/2001

(Continued)

OTHER PUBLICATIONS

Dukkipat, Rao; Vehicle Dynamics; Oct. 200; Narosa; 1st Edition, p. 204.*

(Continued)

*Primary Examiner*—Khoi Tran
*Assistant Examiner*—Nikhil Sriraman
(74) *Attorney, Agent, or Firm*—Harness, Dickey & Pierce, PLC

(57) ABSTRACT

A vehicle stability control system uses a physical quantity corresponding to a driver accelerator input to control engine power produced by an engine and to controllably drive an engine load device for regulating the engine power to produce a desired drive force. The vehicle stability control system includes a vibration detector and a corrector. The vibration detector determines a vibration that occurs during running of the vehicle to disturb the stability of the vehicle. The corrector drives the engine load device to suppress the vibration in response to the vibration determined by the vibration detector.

6 Claims, 8 Drawing Sheets

U.S. PATENT DOCUMENTS

| | | | |
|---|---|---|---|
| 2003/0216215 A1* | 11/2003 | Suzuki et al. | 477/5 |
| 2003/0229429 A1* | 12/2003 | Zhang et al. | 701/22 |
| 2004/0133321 A1* | 7/2004 | Ghoneim et al. | 701/41 |
| 2005/0049761 A1 | 3/2005 | Kataoka et al. | |
| 2005/0164826 A1* | 7/2005 | Albertson | 477/2 |

FOREIGN PATENT DOCUMENTS

| | | |
|---|---|---|
| JP | 62-275813 | 11/1987 |
| JP | 8 216698 | 8/1996 |
| JP | 10-285706 | 10/1998 |
| JP | 11-44229 | 2/1999 |
| JP | 11-311297 | 11/1999 |
| JP | 2000-274268 | 10/2000 |
| JP | 2001-018690 | 1/2001 |
| JP | 2001-037006 | 2/2001 |
| JP | 2001-136605 | 5/2001 |
| JP | 2003-94986 | 4/2003 |
| JP | 2004-168148 | 6/2004 |

OTHER PUBLICATIONS

Chinese Office Action dated Feb. 9, 2007 in the corresponding Chinese Patent Application.

Office Action issued from Japan Patent Office dated Apr. 7, 2009 in the correspondence Japanese Patent Application No. 2004-241009.

Search Report dated Jul. 24, 2009 in corresponding European Patent Application No. 05017427.

* cited by examiner

VEHICLE STABILITY CONTROL SYSTEM

CROSS REFERENCE TO RELATED APPLICATIONS

This application is based upon and claims the benefit of priority of Japanese Patent Application No. 2004-241009, filed on Aug. 20, 2004, the contents of which are incorporated herein by reference.

FIELD OF THE INVENTION

The present invention relates to a vehicle stability control system for suppressing vibrations generated during running of a vehicle.

BACKGROUND OF THE INVENTION

Conventionally, a regenerative brake is known which is designed to produce braking force using a braking apparatus as well as an engine load apparatus, such as an alternator, during braking of the vehicle. An example of such a system is disclosed in Japanese Patent Laid-Open Publication No. Hei 10-285706. The regenerative brake actively turns on an engine load, such as an alternator, during braking of the vehicle in order to absorb kinetic energy of the vehicle, thereby supplementing the braking capability of the braking apparatus.

While the vehicle is running, there are various factors that may disturb the stability of the vehicle. One of the factors includes the fact that more kinetic energy may be produced than is required for the vehicle to run. Conversely, an insufficient amount of kinetic energy may be produced. For example, assuming that the vehicle body is maintained horizontally when in a stable state, a squat may occur which causes the front of the vehicle to displace upward from the stable state due to an excessive drive torque. Additionally, a nosedive may occur which causes the front of the vehicle to displace downward from the stable state due to a drive torque reactive force generated during braking. The squat and the nosedive result from kinetic energy that is produced beyond that which is required for the vehicle to run.

The aforementioned conventional regenerative brake is designed to impose a load on the engine to supplement the braking capability of the braking apparatus. However, no brake currently exists that is designed to absorb excessive kinetic energy by activating the engine load in order to ensure the stability of the vehicle.

SUMMARY OF THE INVENTION

The present invention was developed in view of the aforementioned and other problems. The principles of the present invention provide a vehicle stability control system and a method for offsetting vibrations generated during running of the vehicle. The system and the method are adapted to remove vibrations by establishing an engine load to absorb kinetic energy provided beyond that which is required or to supplement the engine power when the required kinetic energy cannot be obtained.

The inventors of the present invention reviewed the energy that may disturb the stability of a vehicle. FIG. 8 shows various kinetic energies provided by a vehicle. As illustrated, the kinetic energies of the vehicle include the pitching rotational energy, the rolling rotational energy, and the yawing rotational energy. Also included are the translational energy in the X-direction (along which the vehicle travels), the translational energy in the Y-direction (or the lateral direction of the vehicle), and the translational energy in the Z-direction (or the vertical direction of the vehicle).

These kinetic energies have a steady-state value with no vibrational components when the vehicle is in the stable state, and therefore, the inventors of the present invention studied the vibrational components, among other things, as the energy that may disturb the stability of the vehicle. The inventors found that the vibrational energy could always be absorbed, thereby effectively preventing the stability of the vehicle from being disturbed in order to keep the vehicle as close to the stable state at all times. This will be herein described in the context of the pitching vibration as an example; however, it should be appreciated that a similar discussion would be applicable to any other vibrational components.

Here, the pitching vibrational energy refers to the rotational vibrational energy in the pitching direction. The pitching direction is defined as rotating about the vehicle axis in the lateral direction with the center of gravity of the vehicle as its center. The pitching vibrational energy results from a squat caused during acceleration, as shown in FIG. 9A. Additionally, a nosedive caused during deceleration may occur, as shown in FIG. 9B, or during turning, as shown in FIG. 9C.

As shown in FIG. 9A, during acceleration, since the vehicle body cannot follow the rotation of the driving wheels, the nose of the vehicle rises about the center of gravity of the vehicle resulting in a squat. On the other hand, as shown in FIG. 9B, during deceleration, such as braking, since the vehicle body cannot follow the deceleration of the driving wheels due to inertia during application of braking force to the wheels, the nose of the vehicle lowers about the center of gravity of the vehicle resulting in a nosedive. Additionally, as shown in FIG. 9C, while the vehicle is turning, the occurrence of a cornering drag causes the driving wheels to decelerate, thus, resulting in a nosedive similar to that depicted in FIG. 9B.

The rotational vibrations about the center of gravity of the vehicle, such as the squat and nosedive described above, are pitching vibrations. These are pitching vibrational energies or excessive energies that disturb the stability of the vehicle. In other words, an excessive energy provided externally induces the pitching vibration resulting in the pitching vibrational energy. Such pitching vibrational energy occurs almost continuously while the vehicle is running. It can thus be said that the stability of the vehicle can be effectively maintained by suppressing such pitching vibration.

SUMMARY

In this context, one aspect of the present invention provides a vehicle stability control system which uses a physical quantity corresponding to a driver accelerator input to control engine power produced by an engine, as well as to controllably drive an engine load for regulating the engine power, thereby producing a desired drive force. The vehicle stability control system includes vibration detection means for determining a vibration during running of the vehicle. The system also includes correction means for driving the engine load to suppress the vibration in response to the vibration determined by the vibration detection means.

As described above, the system drives the engine load in response to the vibration that disturbs the stability of the vehicle. The engine load suppresses the vibration. This makes it possible to prevent the stability of the vehicle from being disturbed due to the vibration.

In another aspect of the present invention, the vibration detection means can determine a vehicle body input torque and estimate the vibration based on the vehicle body input torque. More specifically, in another aspect of the present invention, the vibration detection means can detect the vibration corresponding to the vehicle body input torque in accordance with an on-spring vehicle body vibration model developed in view of the vibration of the on-spring vehicle body itself that is supported by the front and rear wheel suspensions of the vehicle.

In still another aspect of the present invention, in the case where the engine load is produced by a motor generator that serves as a motor and a generator, the system determines an appropriate axle shaft torque proportion between the engine and the motor generator to produce a desired axle shaft torque. The proportion is based on a physical quantity corresponding to the driver accelerator input. In accordance with the proportion thus determined, the system then allows the motor generator to serve as a motor or a generator or stop. In this arrangement, the correction means can thus correct the vibration-based physical quantity determined by the vibration detection means to obtain a physical quantity corresponding to the amount of drive force allocated to the motor generator, thereby making it possible to suppress the vibration.

In this arrangement and in accordance with yet another aspect of the present invention, when the corrected vibration-based physical quantity provided in accordance with the axle shaft torque proportion is negative in the case of using the motor generator as a motor, the correction means can subtract the physical quantity corresponding to the vibration from a physical quantity corresponding to a drive force generated by the motor to take the resulting physical quantity as a physical quantity corresponding to the proportion of the post-correction drive force for the motor generator. On the other hand, when the corrected vibration-based physical quantity is positive in the case of using the motor generator as a generator, the correction means can subtract the physical quantity corresponding to the vibration from a physical quantity corresponding to a drive force reduced by the generator to take the resulting physical quantity as a physical quantity corresponding to the proportion of the post-correction drive force for the motor generator.

A still further aspect of the present invention supposes that the engine load is a starter or an alternator. In this arrangement, when the corrected vibration-based physical quantity is negative, the correction means outputs the vibration-based physical quantity as an instruction signal for driving the alternator. When the vibration-based physical quantity is positive, the correction means outputs the vibration-based physical quantity as an instruction signal for driving the starter.

According to a still further aspect of the present invention, the aforementioned vibration that disturbs the stability of the vehicle may be, for example, either one of the pitching vibration, the rolling, and the vertically displaced vibration of the vehicle body, and the vertical vibration and the slant angle vibration of the engine.

Other features and advantages of the present invention will be appreciated, as well as methods of operation and the function of the related parts from a study of the following detailed description, appended claims, and drawings, all of which form a part of this application. In the drawings:

DETAILED DESCRIPTION OF THE PREFERRED EMBODIMENTS

Figure 1:
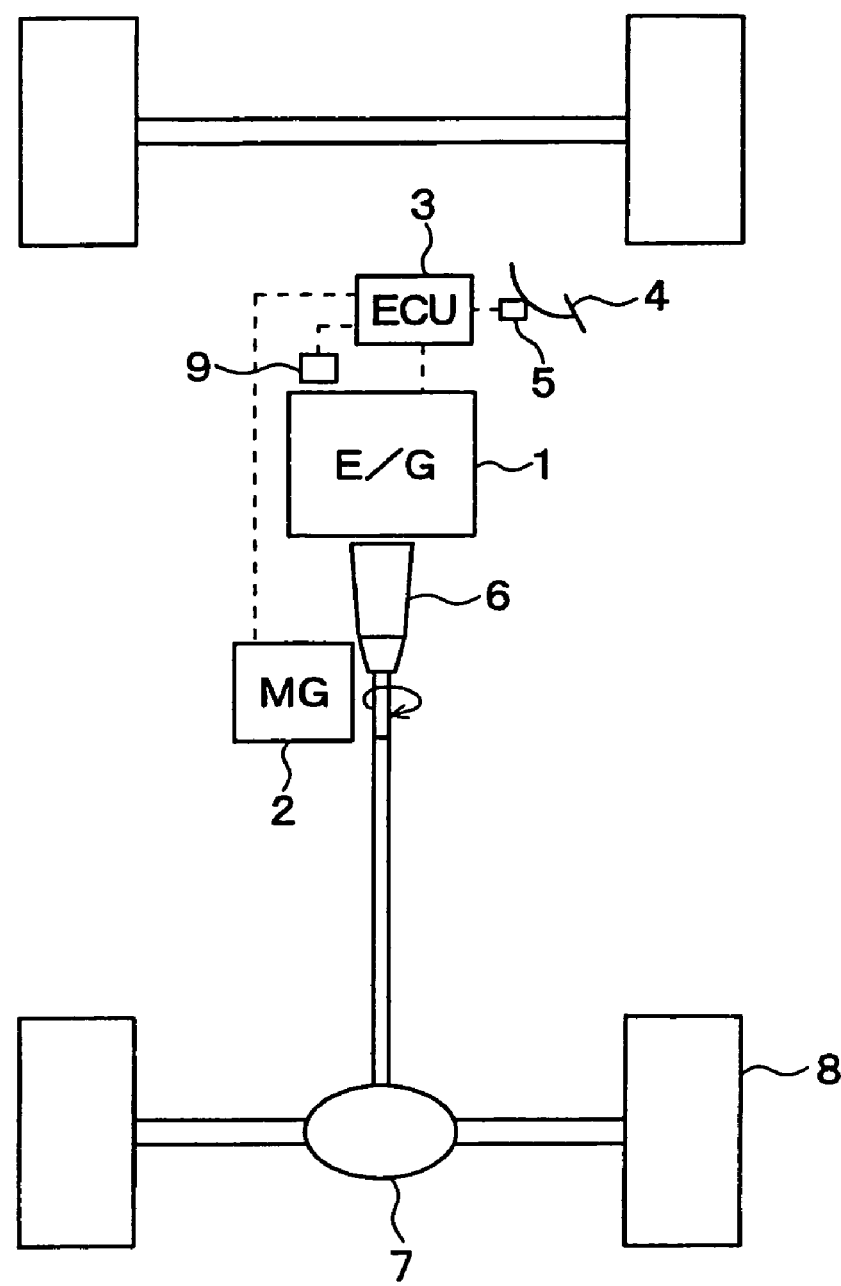
FIG. 1 is a schematic view of a vehicle stability control system according to a first embodiment of the present invention adapted to a vehicle.

Now, an explanation will be given to a vehicle stability control system according to a first embodiment of the present invention. This embodiment shows an example in which the vehicle stability control system is adapted to a vehicle, such as a hybrid vehicle, which has a motor generator. FIG. 1 schematically shows the configuration of the vehicle stability control system according to this embodiment. In this embodiment, a rear-wheel drive vehicle is used for explanatory purposes; however, the present invention is also applicable to a front-wheel drive vehicle or a four-wheel drive vehicle.

The vehicle stability control system according to this embodiment is configured to suppress a vibration, which may disturb the stability of the vehicle, by regulating the drive torque generated by an engine 1 included in the vehicle using a motor generator 2 serving as an engine load device to establish an engine load. Here, the description is given to an example in which the pitching vibration is suppressed.

Figure 2:
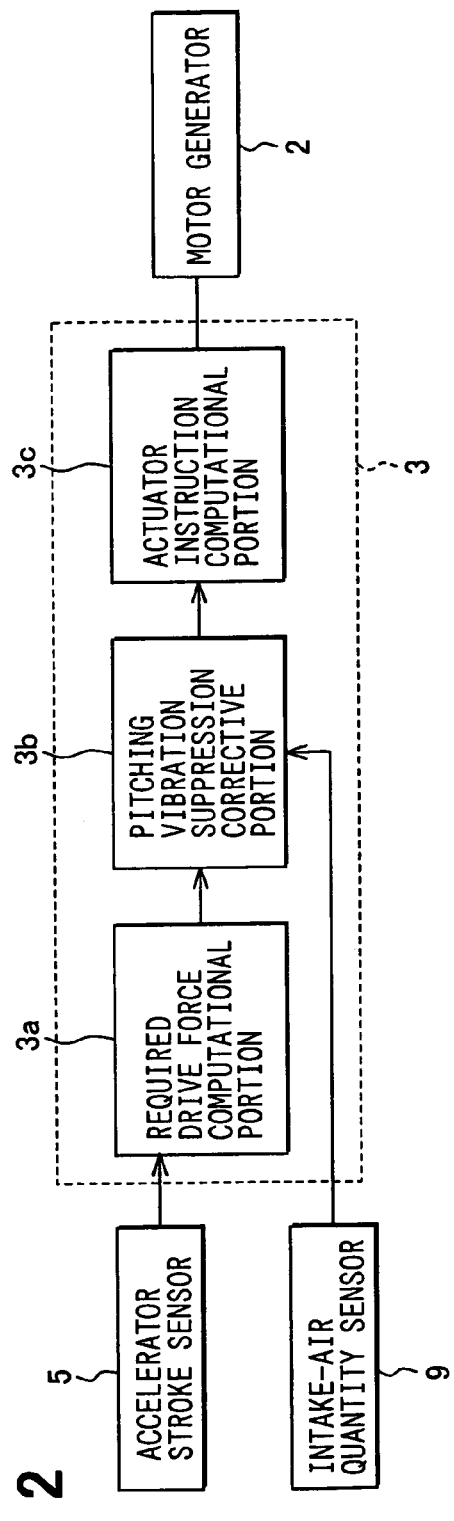
FIG. 2 is a block diagram of an engine electronic control unit of the vehicle stability control system shown in FIG. 1.

In the vehicle stability control system shown in FIG. 1, the engine 1 and the motor generator 2 are controlled by an engine ECU 3. FIG. 2 schematically shows the configuration of the engine ECU 3 in a block diagram.

As shown in FIG. 2, the engine ECU 3 includes a required drive force computational portion 3a, a pitching vibration suppression corrective portion 3b, and an actuator instruction computational portion 3c.

A detected signal corresponding to the amount of operation of an accelerator pedal 4 is delivered from a pedal stroke sensor 5 as a physical quantity corresponding to the driver accelerator input. In this case, the required drive force computational portion 3a determines the amount of operation of the accelerator pedal 4 based on the detected signal, and determines the required axle shaft torque serving as a required drive force corresponding to the amount of operation. The drive torque required by the driver, as determined here, is to be the torque used in accelerating and decelerating the vehicle and is referred to as the required axle shaft torque.

The required drive force computational portion 3a is adapted to determine the required axle shaft torque. The required axle shaft torque is a total sum of the axle shaft torque generated by the engine 1 and the axle shaft torque generated by the motor generator 2. The required drive force computational portion 3a also determines the proportional between the axle shaft torques of the engine 1 and the motor generator 2 to improve the engine efficiency in response to the running condition of the vehicle. The computation or the like of the required axle shaft torque is well known in the field of engine control for a hybrid vehicle and thus, will not be detailed herein.

Once the required axle shaft torque and its proportion are determined, the required drive force computational portion 3a delivers an instructional signal to the engine 1 and the motor generator 2 in order to allow the engine 1 and the motor generator 2 to produce the axle shaft torque in accordance with their respective proportions.

This allows the amount of intake air and the amount of injected fuel for the engine 1 to be regulated, so that energy is delivered according to the proportion. Then, the energy is transmitted as rotational energy to a driving wheel 8 via a transmission (T/M) 6 and a final reduction gear 7 to generate the axle shaft torque in the driving wheel 8 as required.

Additionally, the proportion of the axle shaft torque to be generated by the motor generator 2, as determined in this manner, also serves to determine how the motor generator 2 should be actuated.

Now, the motor generator 2 will be described. The motor generator 2 serves as a motor as well as a generator. Generally, in a hybrid vehicle, the motor generator 2 serves as a motor in a region where the engine has bad efficiency, such as when the vehicle is accelerated from rest. On the other hand, the motor generator 2 stops in a region where the engine has good efficiency, such as when the vehicle is running at an intermittent or low speed load. Finally, the motor generator 2 serves as a generator when the accelerator is released such as during deceleration and braking.

Accordingly, once the instruction signal is delivered to the motor generator 2, the motor generator 2 serves as either a motor or a generator, or stops without serving as either in accordance with its proportion of the axle shaft torque. When serving as a motor, the motor generator 2 produces a positive axle shaft torque to increase the axle shaft torque supplied to the drive wheels. When serving as a generator, the motor generator 2 produces a negative axle shaft torque to decrease the axle shaft torque supplied to the drive wheels. At a standstill, the motor generator 2 is not to produce the axle shaft torque by itself. Accordingly, the motor generator 2 serves as a motor when the drive torque proportion requires a positive axle shaft torque; serves as a generator when a negative axle shaft torque is required; and is brought into a standstill when nothing is required.

As described above, after the proportion of the drive torque to be produced by each of the engine 1 and the motor generator 2 has been determined, the pitching vibration suppression corrective portion 3b corrects the drive torque allocated to the motor generator 2. The pitching vibration suppression corrective portion 3b corresponds to the vibration detection means and the correction means referred to herein.

As described above, the hybrid vehicle determines the drive torque proportion between the engine 1 and the motor generator 2 to provide improved engine efficiency, in which the pitching vibrational energy is included. It is thus necessary to correct the drive torque of the motor generator 2 so that the pitching vibration can be suppressed. For example, when more engine energy has been produced than is necessary and the corrected value (corrected physical quantity) corresponding to the pitching vibration is positive, it is necessary to use the motor generator 2 as a generator to thereby remove the pitching vibration. On the other hand, when less engine energy is provided than is necessary and the corrected value corresponding to the pitching vibration is negative, it is necessary to use the motor generator 2 as a motor to supplement the engine energy to remove the pitching vibration.

The pitching vibration suppression corrective portion 3b performs such a correction. More specifically, the pitching vibration suppression corrective portion 3b determines a vehicle body input torque based on a detected signal, such as from a sensor for sensing the amount of intake air or a current sensor of the motor generator 2. The pitching vibration suppression corrective portion 3b then determines the possible pitching vibration in accordance with the vehicle body input torque and delivers an instruction signal for driving the motor generator 2 in order to suppress the pitching vibration.

In the hybrid vehicle, the engine ECU 3 uses the motor generator 2 as a motor or a generator to improve overall energy efficiency. Accordingly, suppose that the motor generator 2 is used as a motor in a region where the engine efficiency is bad. In this case, when the corrected value corresponding to the pitching vibration is positive, as described above, the required drive force computational portion 3a receives an instruction signal indicative of a motor output from which the corrected value corresponding to the pitching vibration has been subtracted. In contrast to this, suppose that the motor generator 2 is used as a generator during braking. In this case, when the corrected value corresponding to the pitching vibration is negative, as described above, the required drive force computational portion 3a receives an instruction signal indicative of a generator output from which the corrected value corresponding to the pitching vibration has been subtracted.

Now, the pitching vibration suppression corrective portion 3b will be described in detail with reference to FIG. 3.

Figure 3:
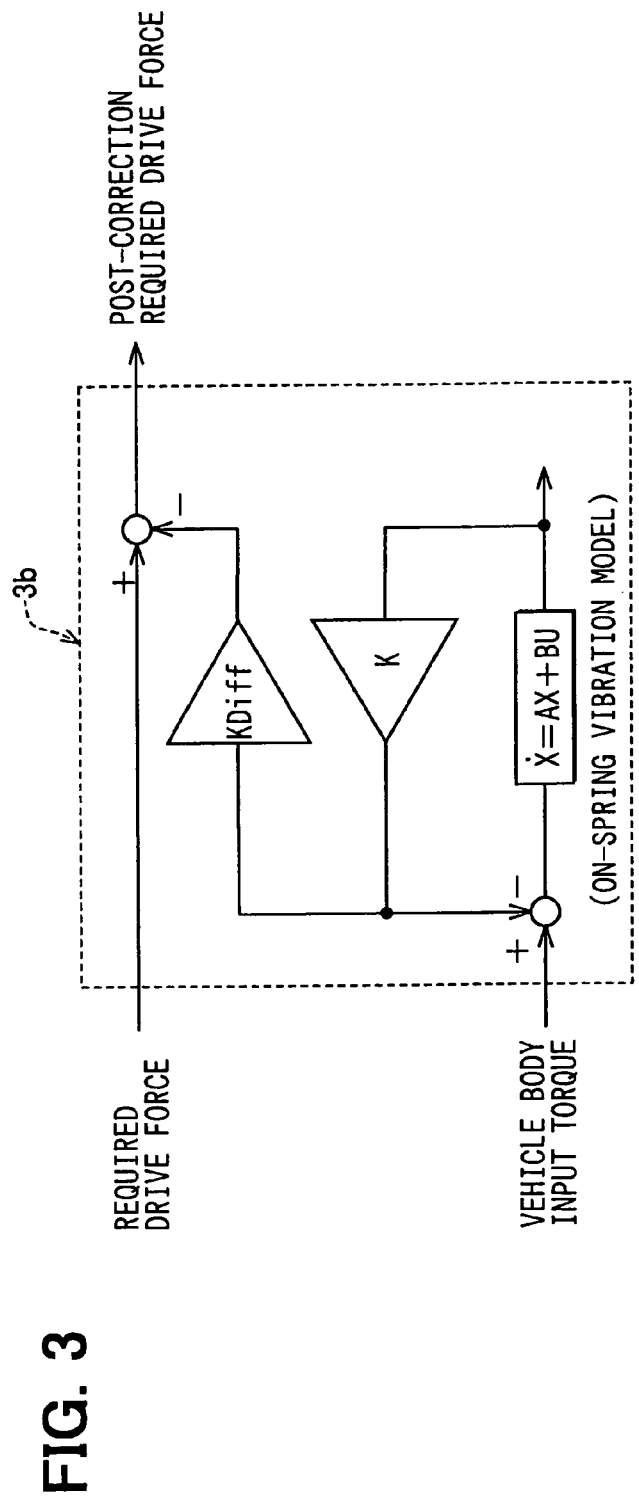
FIG. 3 is a schematic diagram of a pitching vibration suppression corrective portion of the engine electronic control unit of FIG. 2.

FIG. 3 shows a schematic diagram of the pitching vibration suppression corrective portion 3b. As illustrated in the figure, the pitching vibration suppression corrective portion 3b uses an on-spring vibration model to determine the pitching vibrational energy from the vehicle body input torque that is determined, such as from the detected signal provided by an intake-air quantity sensor 9. The pitching vibration suppression corrective portion 3b then determines the torque required to remove the pitching vibrational energy.

Figure 4:
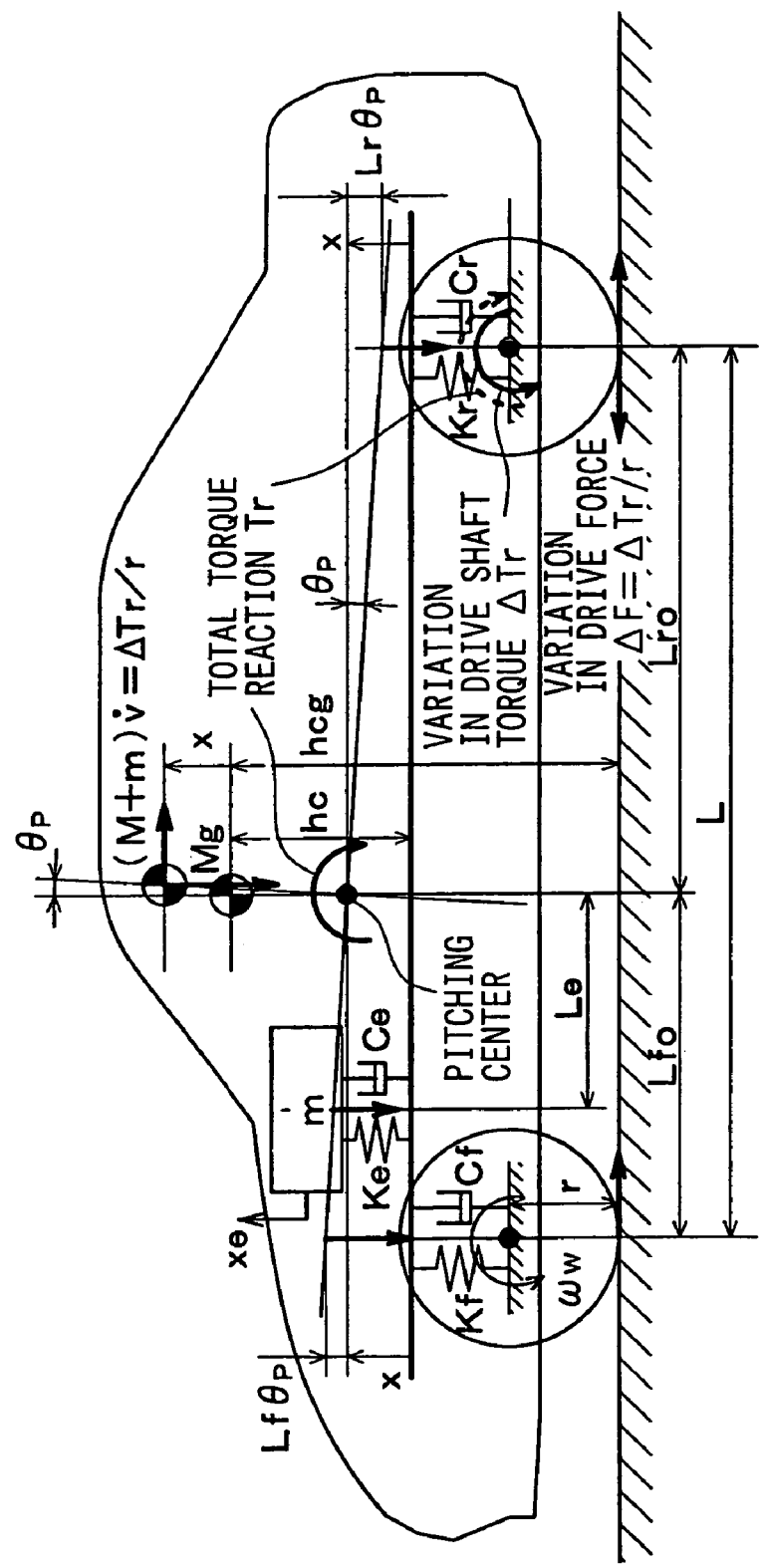
FIG. 4 is a side view of a on-spring vibration model of a vehicle.

In this embodiment, the on-spring vibration model is defined as will be explained below. Now, the on-spring vibration model is explained with reference to a schematic view of the on-spring vibration model shown in FIG. 4.

This on-spring vibration model relies on whether the on-spring portion would be subjected to a total torque reaction Tr at a driving wheel speed of $\omega w$ to be vibrated about the pitching center. Here, the on-spring vibration is modeled on the assumption that the vehicle body is considered to be a flat plate on an arbitrary horizontally-parallel reference plane, with the tires being suspended by a suspension and the engine 1 or the like being mounted on the flat plate.

In the on-spring vibration model, each of the constants is defined as follows. First, for each front and rear driving wheel mounted on the reference plane, defined are suspension spring constants Kf and Kr, suspension damping coefficients Cf and Cr, the weight m of the engine 1, and the spring constant Ke and the damping coefficient Ce of the engine mount.

Also defined are the radius r of the tires, the vehicle body mass M(kg) on the spring, the mass m(kg) of the engine 1 and the T/M 6 combined, the wheel base L(m), and the distance Lfo(m) between the center of gravity of the vehicle and the front axle shaft. Further defined are the distance Lro(m) between the center of gravity of the vehicle and the rear axle shaft, as well as the distance Le between the center of gravity of the vehicle and the center of the mass of the engine 1 and the T/M 6. Still further defined is the distance hc(m) between the the height of the reference plane serving as the vehicle body reference line and the height of the center of gravity of the vehicle.

Also defined is the pitching inertial moment Ip(kgm$^2$) of the vehicle body and the gravitational acceleration g(m/s$^2$).

On the other hand, for independent variables, defined are the vertical displacement x(m) of the vehicle body on the spring, the vertical displacement xe of the engine 1 and the T/M 6, and the pitch angle θp (rad) about a virtual pitching center.

First, the virtual pitch angle about the pitching center is expressed by θp. Accordingly, the amount of displacement about the pitch center of the front axle shaft spaced apart by Lfo from the pitching center is expressed by $Lf\theta_P$, and the amount of displacement about the pitch center of the rear axle shaft spaced apart by Lro from the pitching center is expressed by $Lr\theta_P$.

Therefore, an equation of the motion about the pitch center of the vehicle body is expressed as in Equation 1 provided below.

Equation 1:

$$Ip\theta p'' = -Lf\{Kf(x + Lf\theta p) + Cf(x' + Lf\theta p')\} - Le\{Ke(x + Le)\theta p - xe) + Ce(x' + Lf\theta p' - xe')\} + Lr\{Kr(x - Lr\theta p) + Cr(x' - Lr\theta p')\} + hc\theta pMg + (M + m)v'hc + \Delta Tr$$

The equations of vertical motion of the vehicle body and of the engine 1 and the T/M 6 are expressed in Equations 2 and 3, respectively provided below.

Equation 2:

$$Mx'' = -Kf(x + Lf\theta p) - Cf(x' + Lf\theta p') - Ke(x + Le\theta p - xe) - Ce(x' + Lf\theta p' - xe') - Kr(x - Lr\theta p) - Cr(x' - Lr\theta p')$$

Equation 3:

$$mxe'' = -Ke(xe - x - Le\theta p) - Ce(xe' - x' - Le\theta p')$$

Xe", x", and θp" are determined from Equations 1 to 3 to give Equations 4 to 6, respectively provided below.

Equation 4:

$$xe'' = -Ke/m \cdot xe - Ce/m \cdot xe' + Ke/m \cdot x + Ce/m \cdot x' + KeLe/m \cdot \theta p + CeLe/m \cdot \theta p'$$

Equation 5:

$$x'' = Ke/M \cdot xe + Ce/M \cdot xe' - (Ke + Kf + Kr)/M \cdot x - (Ce + Cf + Cr)/M \cdot x' - (KfLf + KeLe - KrLr)/M \cdot \theta p - (CfLf + CeLe - CrLr)/M \cdot \theta p'$$

Equation 6:

$$\theta p'' = KeLe/Ip \cdot xe + CeLe/Ip \cdot xe' - (KfLf + KeLe - KrLr)/Ip \cdot x - (CfLf + CeLe - CrLr)/Ip \cdot x' - (KfLf^2 + KeLe^2 + KrLr^2 - hcMg)/Ip \cdot \theta p - (CfLf^2 + CeLe^2 - CrLr^2)/Ip \cdot \theta p'$$

Therefore, assuming that each state quantity is defined such that xe=x1, xe'=x2, x=x3, x'=x4, θp=x5, θp'=x6, and input u=Δ Tr; coefficients of the variables in each of the aforementioned equations are defined to be a1 to a6, b1 to b6, c1 to c6, and p1, thereby each of the aforementioned equations are transformed as follows:

Equation 7:

$$xe'' = a1xe + a2xe' + a3x + a4x' + a5\theta p + a6\theta p'$$
$$= a1x1 + a2x2 + a3x3 + a4x4 + a5x5 + a6x6$$

Equation 8:

$$x'' = b1xe + b2xe' + b3x + b4x' + b5\theta p + b6\theta p'$$
$$= b1x1 + b2x2 + b3x3 + b4x4 + b5x5 + b6x6$$

Equation 9:

$$\theta p'' = c1xe + c2xe' + c3x + c4x' + c5\theta p + c6\theta p' + p1u$$
$$= c1x1 + c2x2 + c3x3 + c4x4 + c5x5 + c6x6 + p1u$$

In the aforementioned Equations 7 to 9, it is defined such that a1=−Ke/m, a2=−Ce/m, a3=Ke/m, a4=Ce/m, a5=KeLe/m, a6=CeLe/m, b1=Ke/M, b2=Ce/M, b3=−(Ke+Kf+Kr)/M, b4=−(Ce+Cf+Cr)/M, b5=−(KfLf+KeLe−KrLr)/M, b6=−(CfLf+CeLe−CrLr)/Mc1=KeLe/Ip, c2=CeLe/Ip, c3=−(KfLf+KeLe−KrLr)/Ip, c4=−(CfLf+CeLe−CrLr)/Ip, c5=−(KfLf$^2$+KeLe$^2$+KrLr$^2$−hcMg)/Ip, c6=−(CfLf$^2$+CeLe$^2$+CrLr$^2$)/Ip, and p1=(1+hc/r)/Ip.

Since x1 to x6 have been defined above, the following relations hold true:

| | |
|---|---|
| x'1=xe'=x2 | Equation 10 |
| x'2=xe''=a1x1+a2x2+a3x3+a4x4+a5x5+a6x6 | Equation 11 |
| x'3=x'=x4 | Equation 12 |
| x'4=x''=b1x1+b2x2+b3x3+b4x4+b5x5+b6x6 | Equation 13 |
| x'5=θp'=x6 | Equation 14 |
| x'6=θp''=c1x1+c2x2+c3x3+c4x4+c5x5+c6x6+p1u | Equation 15 |

Therefore, the equations of state of the state space representations shown by Equations 10 to 15 are expressed as in Equation 16 provided below.

$$x' = Ax + Bu \qquad \text{Equation 6}$$

$$x = [x1 \quad x2 \quad x3 \quad x4 \quad x5 \quad x6]^T$$

$$= [xe \quad xe' \quad x \quad x' \quad \theta p \quad \theta p']$$

$$A = \begin{bmatrix} 0 & 1 & 0 & 0 & 0 & 0 \\ a1 & a2 & a3 & a4 & a5 & a6 \\ 0 & 0 & 0 & 1 & 0 & 0 \\ b1 & b2 & b3 & b4 & b5 & b6 \\ 0 & 0 & 0 & 0 & 0 & 1 \\ c1 & c2 & c3 & c4 & c5 & c6 \end{bmatrix}$$

$$B = [0 \quad 0 \quad 0 \quad 0 \quad 0 \quad p1]^T$$

Equation 16 is the equation of state of the on-spring vibration model with x'=Ax+Bu shown in FIG. 3.

This equation of state is used to calculate the amount of correction for suppressing the pitching vibration. In the calculation, a known technique, such as a technique for designing an optimized regulator, may be used to determine the state feedback gain K. However, the technique will not be detailed herein.

The Δ Tr is determined in this manner, and then multiplied by KDiff. The resulting value is subtracted from the motor generator 2 proportion of the axle shaft torque determined previously by the required drive force computational portion 3a, thereby providing a computed post-correction required drive force. That is, the motor generator 2 proportion of axle shaft torque determined by the required drive force computational portion 3a is the axle shaft torque to be used for acceleration and deceleration. The axle shaft torque determined by the pitching vibration suppression corrective portion 3b is the axle shaft torque corresponding to the corrected value for the pitching vibration. Accordingly, the corrected value of torque is subtracted from the axle shaft torque to be used for acceleration and deceleration, thereby allowing for the determination of the post-correction required axle shaft torque corresponding to the post-correction drive force to which a correction is made using the corrected value corresponding to the pitching vibration.

Here, K is a designed value, which is defined in accordance with the aforementioned independent variables or constants, while KDiff is a value to be determined by the gear ratio of the final reduction gear 7.

To produce the post-correction required axle shaft torque determined by the pitching vibration suppression corrective portion 3b, the actuator instruction computational portion 3c delivers to the motor generator 2 an instruction signal corresponding with the post-correction required axle shaft torque. In accordance with the instruction signal, the motor generator 2 will serve as either a motor or a generator, or stop, thereby generating the post-correction required axle shaft torque.

Figure 5:
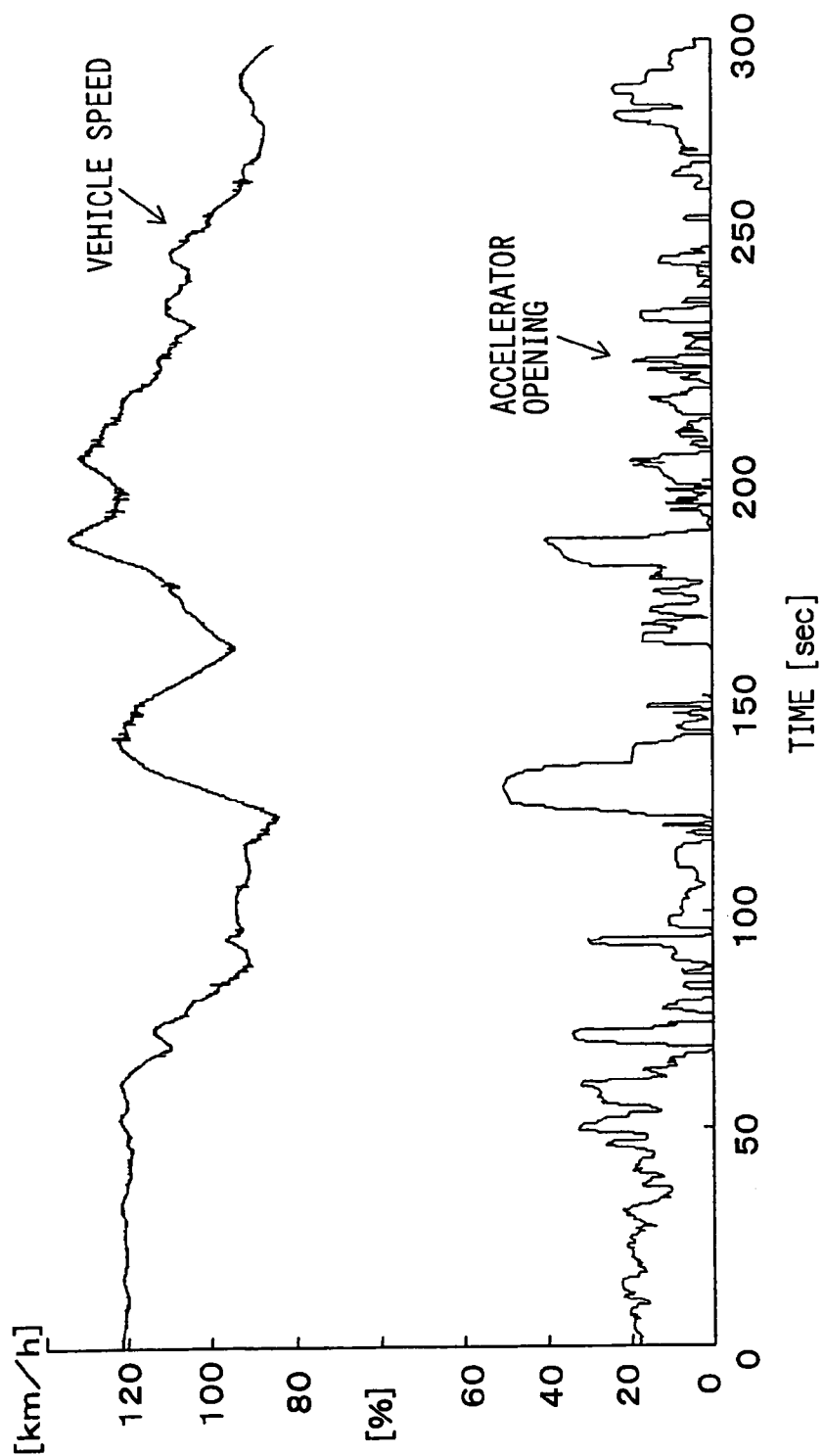
FIG. 5 is a timing chart of vehicle speed and accelerator opening when a vehicle equipped with the vehicle stability control system of FIG. 1 is running on a highway.
Figure 6:
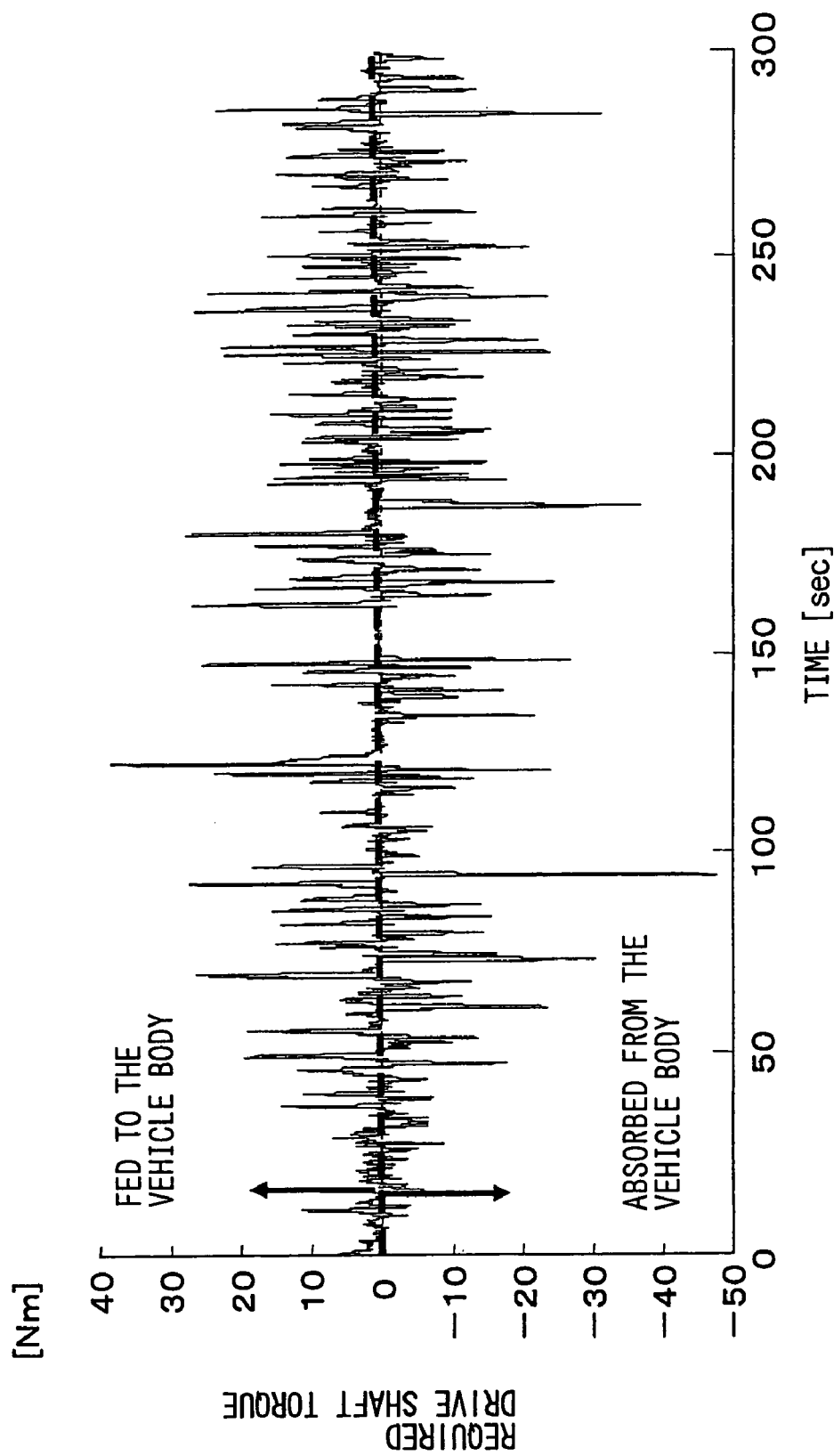
FIG. 6 is a timing chart of a corrective torque produced by a motor generator when a vehicle equipped with the vehicle stability control system of FIG. 1 is running on a highway.

In the aforementioned arrangement, each portion of the ECU 3 performed the aforementioned computations to control the engine 1 and the motor generator 2, the experimental results of which are shown in FIGS. 5 and 6. FIGS. 5 and 6 show actual running data on a vehicle, running on a highway and equipped with the vehicle stability control system of this embodiment. FIG. 5 shows the vehicle speed and the accelerator opening in the form of a timing chart. FIG. 6 shows, in the form of a timing chart, the correction torque provided by the motor generator 2 with the same timing as in FIG. 5.

Assuming that changes in accelerator opening result in changes of vehicle speed, as represented in FIG. 5, the correction axle shaft torque provided by the motor generator 2 varies, as shown in FIG. 6. As shown in the figure, when more engine energy is produced than is necessary resulting in a pitching vibration, the axle shaft torque for absorbing the excessive energy is the correction axle shaft torque. When less engine energy is produced than is necessary resulting in a pitching vibration, the axle shaft torque for supplementing the lack of energy is the correction axle shaft torque.

Accordingly, the motor generator 2 can be used as a motor or a generator to regulate the engine energy, thereby removing the pitching vibration. This makes it possible to prevent the stability of the vehicle from being disturbed due to the pitching vibration, thus realizing stabilized running of the vehicle.

Figure 7:
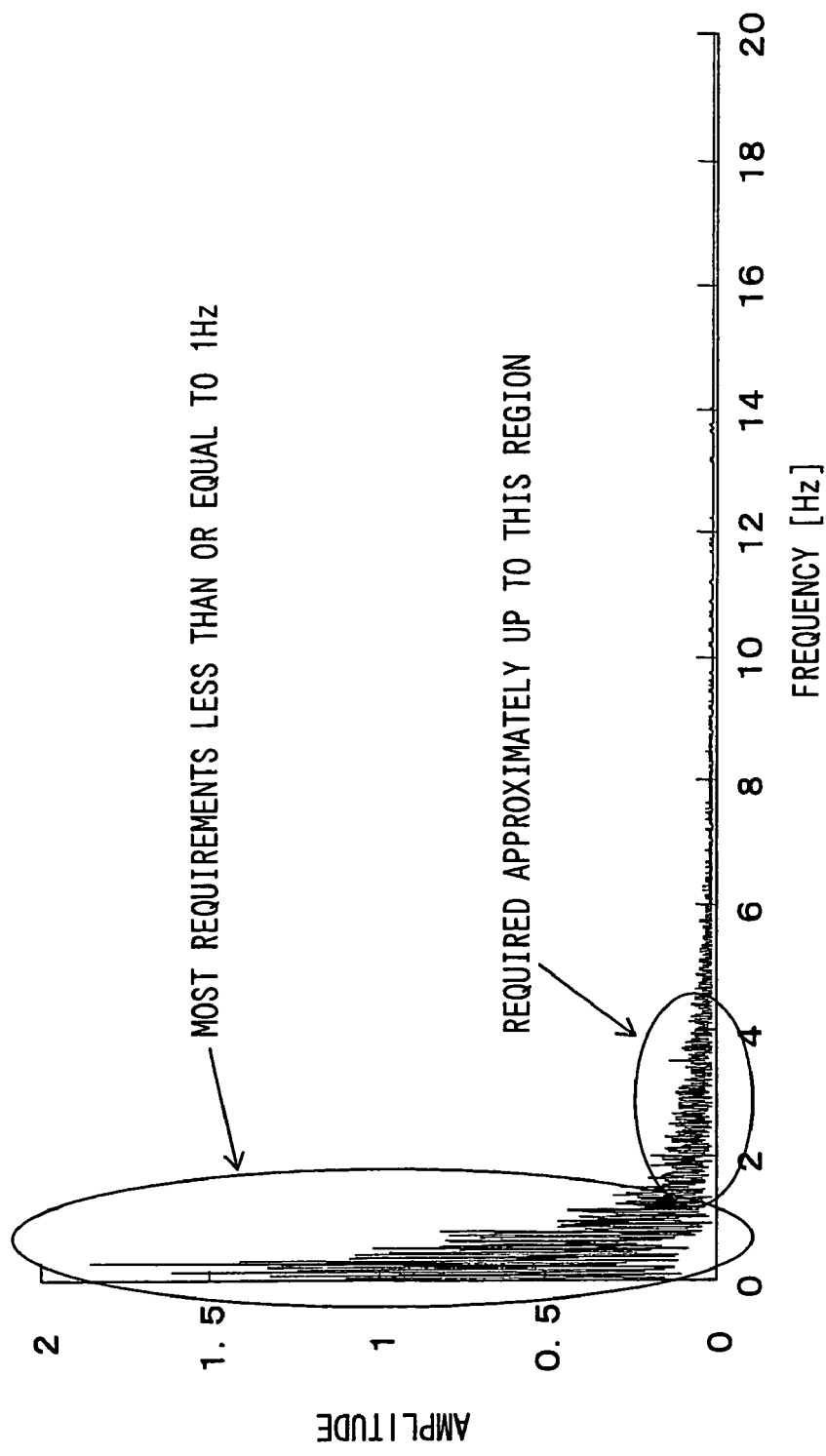
FIG. 7 is a graph illustrating a frequency distribution of variations in corrective torque produced by the motor generator associated with FIG. 6.
Figure 8:
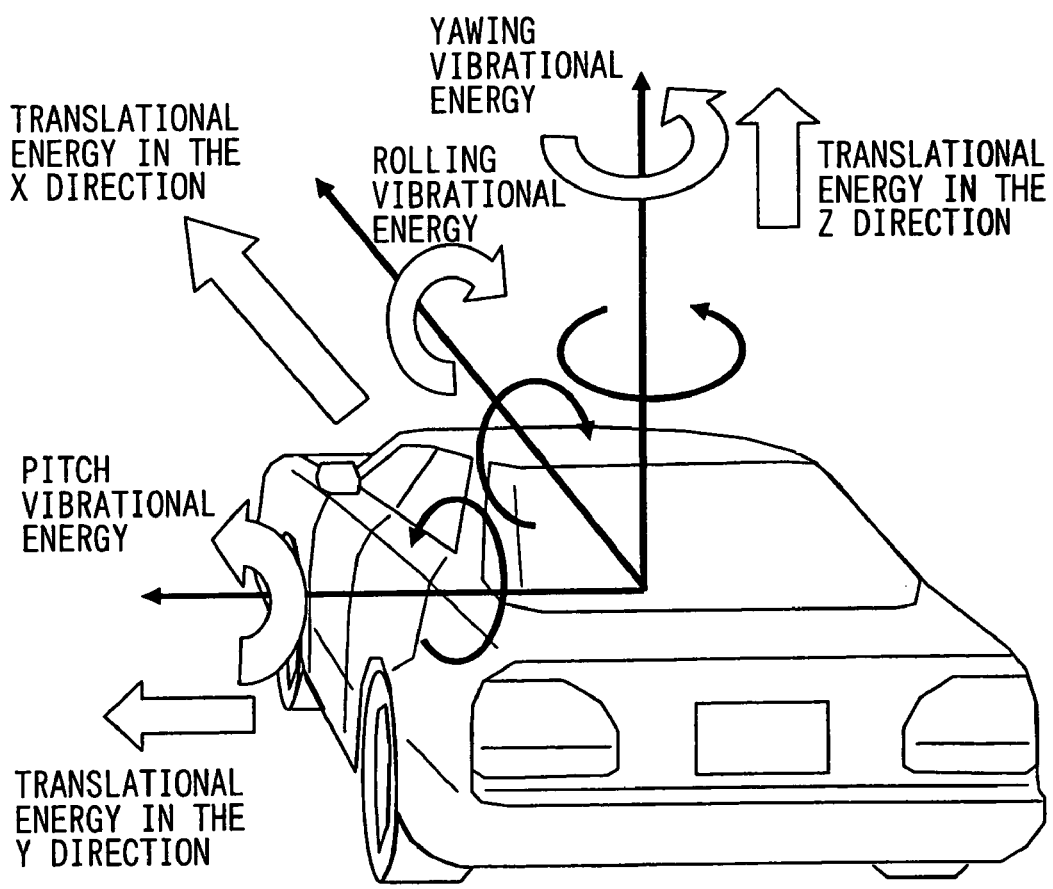
FIG. 8 is an isometric view of a vehicle illustrating various vibrational energies.
Figure 9A:
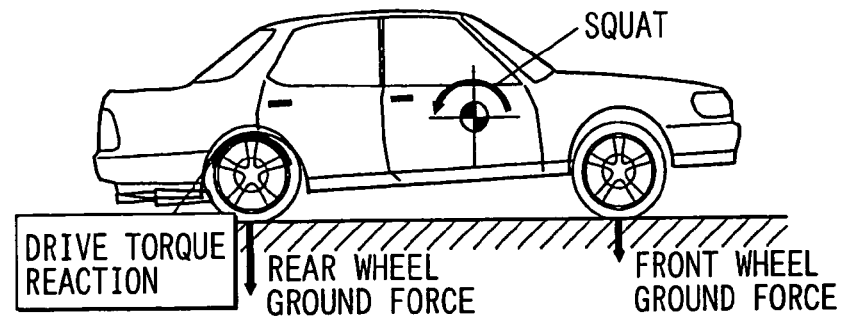
FIGS. 9A-9C are side views of a vehicle in a squat position due to acceleration, a nosedive position due to deceleration, and a nosedive position due to turning, respectively.
Figure 9B:
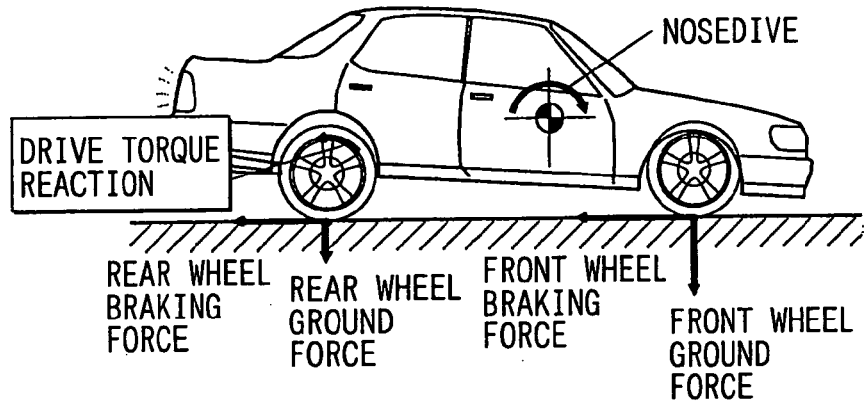
Figure 9C:
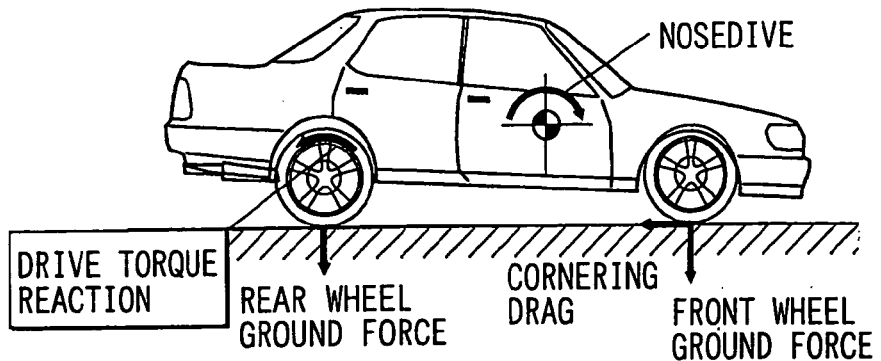

FIG. 7 provides a graph illustrating a frequency study of the variations in correction axle shaft torque provided by the motor generator 2. As shown in this figure, it can be seen that the frequency strength distribution is highly intensive in a region of frequencies less than or equal to 1 Hz, with most frequencies concentrated in a region less than or equal to 4 Hz. For this reason, the region that is necessary for frequency response of the motor generator 2 is conceivably at approximately 4 Hz or less. To neglect the transient response of the motor generator 2, a performance at 5 to 10 times the required frequency is sufficient as the frequency response of the motor generator 2. For example, with a frequency response of about 20 Hz, the motor generator 2 can sufficiently regulate the correction axle shaft torque in this embodiment.

As described above, the vehicle stability control system of this embodiment can suppress the pitching vibration. This makes it possible to prevent the stability of the vehicle from being disturbed due to the pitching vibration, thus realizing stabilized running of the vehicle.

Furthermore, the vibrational energy is removed in this manner, thereby making it possible to adjust the engine energy to a better value of efficiency, as well as to improve fuel efficiency. Still further, the excessive energy can be used for generating electric power, thereby allowing the electric energy to be utilized efficiently.

The aforementioned embodiment uses the motor generator 2 as the engine load device, in which the motor generator 2 is used as a motor and a generator, thereby addressing both the cases where the corrected physical quantity corresponding to the pitching vibration is positive and negative. However, the motor generator 2 is only one example of the engine load device; other load devices, such as one including a starter and an alternator may also be employed. In this case, the combination of the starter and the alternator could also address both the cases where the corrected physical quantity corresponding to the pitching vibration is positive and negative.

Furthermore, the aforementioned embodiment allows the engine ECU 3 to determine the instruction signal for the motor generator 2; however, other aspects of the system other than the engine ECU 3 may also employed. In this case, since the required drive force is calculated generally in the engine ECU 3, it is also possible to obtain the torque used for acceleration and deceleration of the vehicle from a calculation result provided by the engine ECU 3.

Furthermore, the aforementioned embodiment allocates the axle shaft torque corresponding to the drive force to the engine 1 and the motor generator 2, and thereafter makes a correction to suppress the pitching vibration. However, the present invention is also applicable to an arrangement in which a correction to suppress the pitching vibration is first made to the drive force, which is then allocated between the engine 1 and the motor generator 2.

Still further, the aforementioned embodiment directly determines a physical quantity, which is the axle shaft torque corresponding to the drive force, in order to remove the pitching vibrational energy. However, other physical quantities may also be employed, or a converted physical quantity corresponding to the axle shaft torque may be employed to carry out each of the aforementioned calculations.

Furthermore, the aforementioned embodiment has been described in accordance with an example of pitching vibration employed as a vibration that disturbs the stability of the vehicle; however, the same method is also applicable to other vibrational energies. Such a vibration may include a rolling vibration of the vehicle, a vertical vibration of the vehicle, a vertical vibration of the engine, and a slant angle vibration of the engine.

What is claimed is:

1. A vehicle stability control system of a vehicle having a vehicle body, front and rear wheel suspensions that support the vehicle body, an accelerator and power regulating means for regulating engine power, thereby producing a desired vehicle drive force, the vehicle stability control system comprising:
    body vibration detection means for detecting a pitching vibration of the vehicle body which occurs during running of the vehicle based on a vehicle body input torque from a quantity sensor; and
    correction means configured to determine a correction physical quantity corresponding to the pitching vibration detected by the body vibration detection means, and control the power regulating means based at least on the correction physical quantity,
    wherein the correction means determines a drive force proportion between the engine and the power regulating means based on operation of the accelerator, and corrects a physical quantity corresponding to the drive force proportion based on the correction physical quantity,
    wherein the power regulating means is a motor generator, and
    when the motor generator operates as a motor and the correction physical quantity is negative, the correction means subtracts an absolute value of the correction physical quantity from a physical quantity corresponding to a drive force increased by the motor generator, and
    when the motor generator operates as a generator and the correction physical quantity is positive, the correction means subtracts an absolute value of the correction physical quantity from a physical quantity corresponding to a drive force reduced by the motor generator.

2. A vehicle stability control system of a vehicle having a vehicle body, front and rear wheel suspensions that support the vehicle body, an accelerator and power regulating means for regulating engine power, thereby producing a desired vehicle drive force, the vehicle stability control system comprising:
    body vibration detection means for detecting a pitching vibration of the vehicle body which occurs during running of the vehicle based on a vehicle body input torque from a quantity sensor; and
    correction means configured to determine a correction physical quantity corresponding to the pitching vibration detected by the body vibration detection means, and control the power regulating means based at least on the correction physical quantity,
    wherein the correction means determines a drive force proportion between the engine and the power regulating means based on operation of the accelerator, and corrects a physical quantity corresponding to the drive force proportion based on the correction physical quantity,
    wherein the power regulating means is a set of a starter and an alternator, and
    when the correction physical quantity is negative, the correction means outputs the correction physical quantity as an instruction signal for driving the alternator, and
    when the correction physical quantity is positive, the correction means outputs the correction physical quantity as an instruction signal for driving the starter.

3. A vehicle stability control system of a vehicle having a vehicle body, front and rear wheel suspensions that support the vehicle body, an accelerator and power regulating means for regulating engine power, thereby producing a desired vehicle drive force, the vehicle stability control system comprising:
    body vibration detection means for detecting a pitching vibration of the vehicle body which occurs during running of the vehicle based on a vehicle body input torque from a quantity sensor; and
    correction means configured to determine a correction physical quantity corresponding to the pitching vibration detected by the body vibration detection means, and control the power regulating means based at least on the correction physical quantity,
    wherein the correction means determines a drive force proportion between the engine and the power regulating means based on operation of the accelerator, and corrects a physical quantity corresponding to the drive force proportion based on the correction physical quantity,
    wherein the power regulating means is a starter, and
    when the correction physical quantity is positive, the correction means outputs the correction physical quantity as an instruction signal for driving the starter.

4. A vehicle stability control system of a vehicle having a vehicle body, front and rear wheel suspensions that support the vehicle body, an accelerator and power regulating means for regulating engine power, thereby producing a desired vehicle drive force, the vehicle stability control system comprising:
    body vibration detection means for detecting a pitching vibration of the vehicle body which occurs during running of the vehicle based on a vehicle body input torque from a quantity sensor; and
    correction means configured to determine a correction physical quantity corresponding to the pitching vibration detected by the body vibration detection means, and control the power regulating means based at least on the correction physical quantity,
    wherein the correction means determines a drive force proportion between the engine and the power regulating means based on operation of the accelerator, and corrects a physical quantity corresponding to the drive force proportion based on the correction physical quantity,
    wherein the power regulating means is an alternator, and
    when the correction physical quantity is negative, the correction means outputs the correction physical quantity as an instruction signal for driving the alternator.

5. A vehicle stability control system of a vehicle having a vehicle body, front and rear wheel suspensions that support the vehicle body, an accelerator and motor generator for regulating engine power, thereby producing a desired vehicle drive force, the vehicle stability control system comprising:
    body vibration detection means for detecting a body vibration about a pitching center of the vehicle body which occurs during running of the vehicle; and correction means for determining a drive force proportion between the engine and the motor generator based on operation of the accelerator, controlling operation of the motor generator according to the drive force proportion, and correcting a physical quantity corresponding to the drive force proportion based on a correction physical quantity corresponding to the body vibration, wherein when the motor generator operates as a motor and the correction physical quantity is negative, the correction means subtracts an absolute value of the correction physical quantity from a physical quantity corresponding to a drive force increased by the motor generator, and when the motor generator operates as a generator and the correction physical quantity is positive, the correction means subtracts an absolute value of the correction physical quantity from a physical quantity corresponding to a drive force reduced by the motor generator.

6. A vehicle stability control system of a vehicle having a vehicle body, front and rear wheel suspensions that support the vehicle body, an accelerator and a set of a starter and an alternator for regulating engine power, thereby producing a desired vehicle drive force, the vehicle stability control system comprising:

body vibration detection means for detecting a body vibration about a pitching center of the vehicle body which occurs during running of the vehicle; and correction means for determining a drive force proportion between the engine and at least one of the starter and the alternator based on operation of the accelerator, controlling operation of the at least one of the starter and the alternator according to the drive force proportion, and correcting a physical quantity corresponding to the drive force proportion based on a correction physical quantity corresponding to the body vibration, wherein when the correction physical quantity is negative, the correction means outputs the correction physical quantity as an instruction signal for driving the alternator, and when the correction physical quantity is positive, the correction means outputs the correction physical quantity as an instruction signal for driving the starter.

* * * * *